(12) United States Patent
Morris et al.

(10) Patent No.: US 9,201,748 B2
(45) Date of Patent: Dec. 1, 2015

(54) VIRTUAL DEVICE SPARING

(75) Inventors: Brian S. Morris, Santa Clara, CA (US);
Sailesh Kottapalli, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/996,717

(22) PCT Filed: Mar. 30, 2012

(86) PCT No.: PCT/US2012/031680
§ 371 (c)(1),
(2), (4) Date: Jun. 21, 2013

(87) PCT Pub. No.: WO2013/147886
PCT Pub. Date: Oct. 3, 2013

(65) Prior Publication Data
US 2013/0311821 A1     Nov. 21, 2013

(51) Int. Cl.
*G06F 11/00* (2006.01)
*G06F 11/20* (2006.01)
*G06F 11/16* (2006.01)

(52) U.S. Cl.
CPC ........ *G06F 11/2094* (2013.01); *G06F 11/1658* (2013.01); *G06F 11/1666* (2013.01); *G06F 11/20* (2013.01); *G06F 2201/815* (2013.01)

(58) Field of Classification Search
USPC .......................................... 714/6.3, 6.32, 6.2
See application file for complete search history.

(56) References Cited

U.S. PATENT DOCUMENTS

| | | | |
|---|---|---|---|
| 7,996,710 B2* | 8/2011 | Nagaraj et al. | 714/6.1 |
| 8,046,628 B2 | 10/2011 | Resnick | |
| 2002/0174311 A1* | 11/2002 | Ware et al. | 711/167 |
| 2007/0106860 A1* | 5/2007 | Foster et al. | 711/170 |
| 2010/0162037 A1 | 6/2010 | Maule et al. | |
| 2010/0217915 A1 | 8/2010 | O'Connor et al. | |

OTHER PUBLICATIONS

International Preliminary Report on Patentability for PCT/US2012/031680 mailed Oct. 9, 2014, 7 pages.
International Search Report and Written Opinion for PCT/US2012/031680 mailed Nov. 30, 2012, 10 pages.

* cited by examiner

*Primary Examiner* — Sarai Butler
(74) *Attorney, Agent, or Firm* — Blakely, Sokoloff, Taylor & Zafman LLP

(57) ABSTRACT

Systems and techniques for virtual device sharing. A failure of one of a plurality of memory devices corresponding to a first rank in a memory system is detected. The memory system has a plurality of ranks, each rank having a plurality of memory devices used to store a cache line. A portion of the cache line corresponding to the failed memory device is stored in a memory device in a second rank in the memory system and the remaining portion of the cache line in the first rank of the memory system.

22 Claims, 4 Drawing Sheets

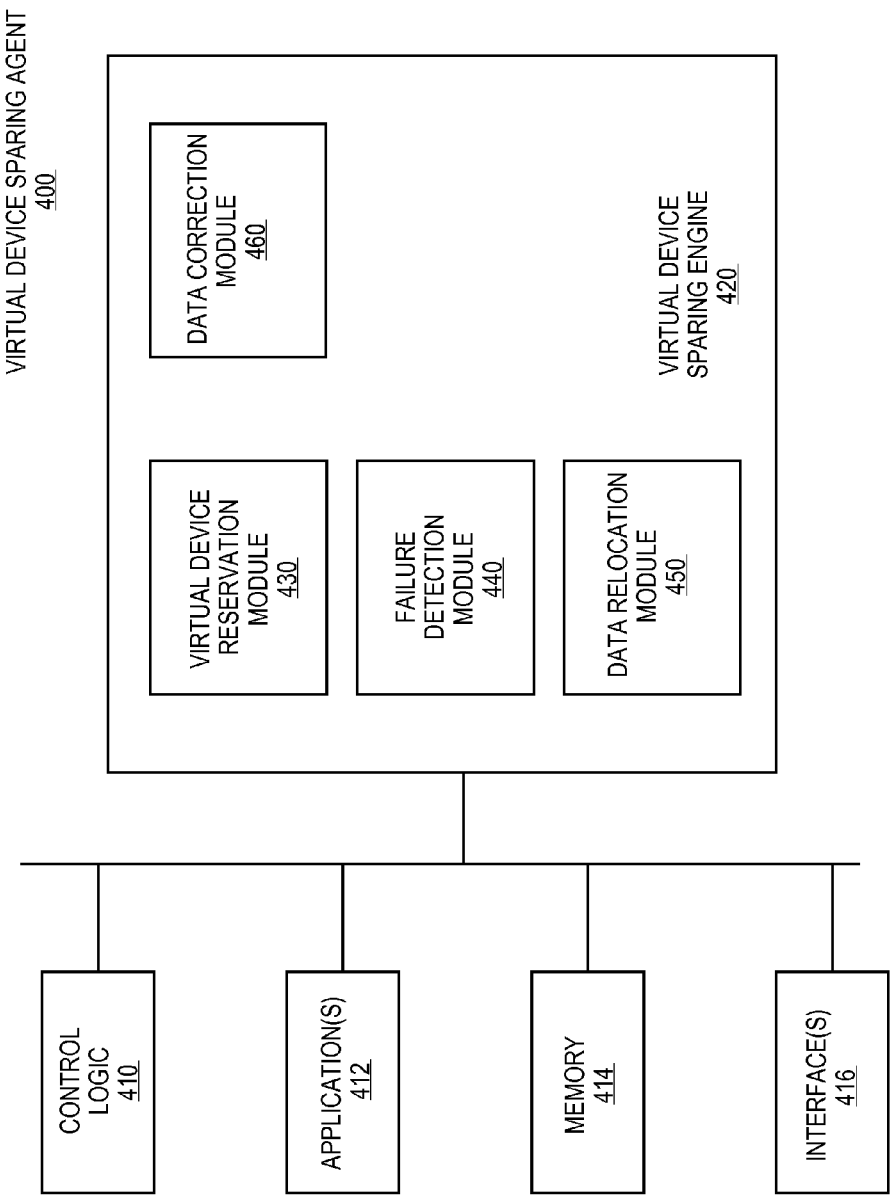

US 9,201,748 B2

VIRTUAL DEVICE SPARING

CROSS-REFERENCE TO RELATED APPLICATION

This patent application is a U.S. National Phase Application under 35 U.S.C. §371 of International Application No. PCT/US2012/031680, filed Mar. 30, 2012, entitled VIRTUAL DEVICE SPARING.

TECHNICAL FIELD

Embodiments of the invention relate to memory systems. More particularly, embodiments of the invention relate to techniques for managing systems having failed or failing memory devices.

BACKGROUND

Computer systems, particularly servers, utilize memory devices that are known to be less reliable than would be desirable. Various reliability features have been developed to address this known unreliability. Generically, these features may be referred to as reliability, availability and serviceability (RAS) features. Rank sparing and double device data correction (DDDC) are examples of RAS features.

Rank sparing requires that a whole rank of memory be held in reserve to cover for a failed device in the future. This can be wasteful of system resources. DDDC typically requires lockstepping, which requires high power consumption and reduced bandwidth. Thus, current RAS features are not particularly resource-efficient.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 is a block diagram of a virtual device sparing agent.

DETAILED DESCRIPTION

Figure 1:
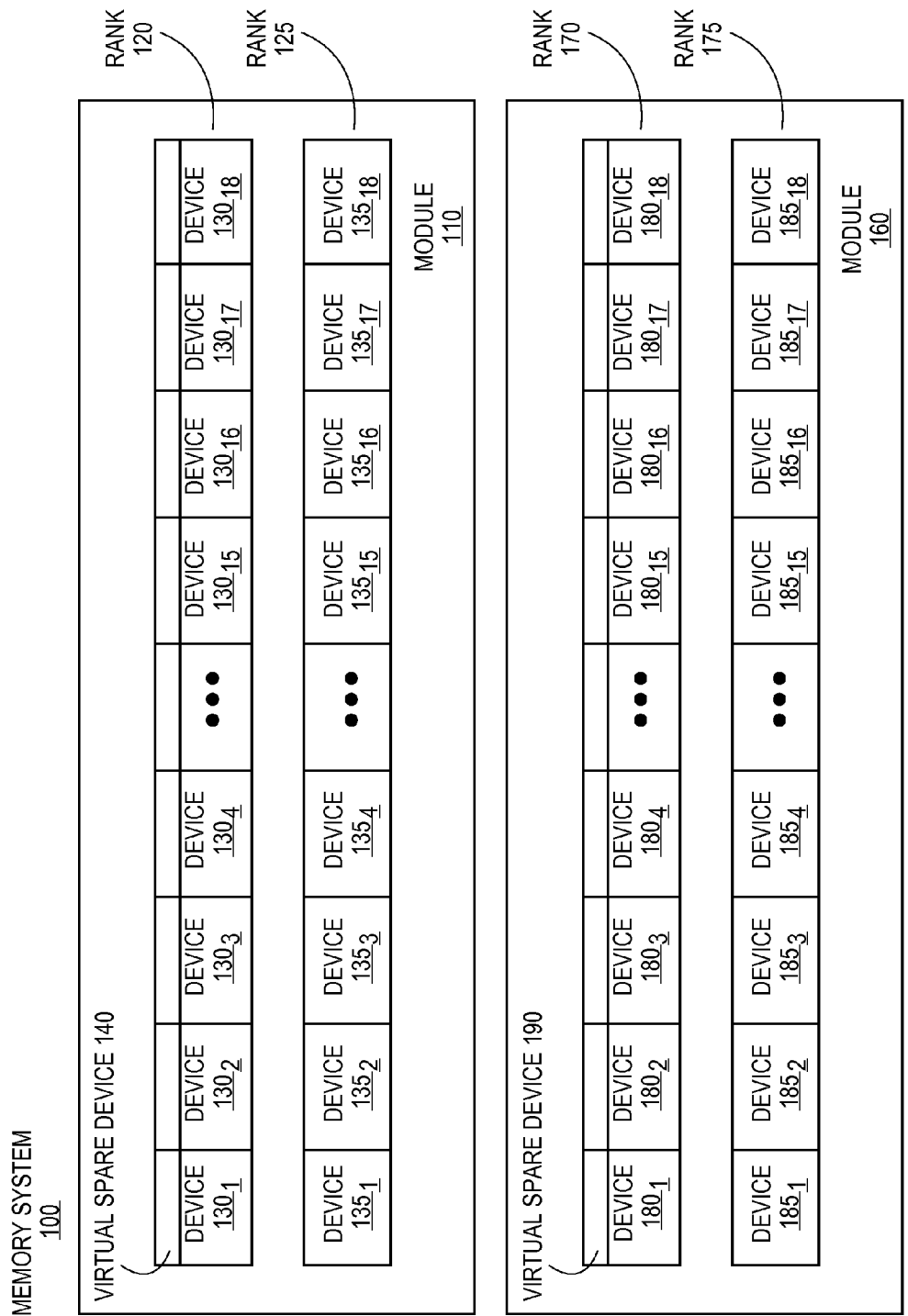
FIG. 1 is a conceptual diagram of one embodiment of a multi-rank memory system that may be used to provide virtual device sparing as described herein.

In the following description, numerous specific details are set forth. However, embodiments of the invention may be practiced without these specific details. In other instances, well-known circuits, structures and techniques have not been shown in detail in order not to obscure the understanding of this description.

Described herein, are techniques for virtual device sparing that reserves only a fraction of a rank's capacity to cover for a failed device and does not require power or bandwidth until after a device has failed. Thus, the virtual device sharing provides a more efficient resource utilization while providing device recovery or correction.

Virtual device sparing utilizes the fact that when a memory device fails, other memory devices in the same rank are independent of the failing device and likely unaffected. In contrast to rank sparing that keeps an entire spare rank in reserve, virtual device sparing carves out a portion of the address space of a particular rank (a subset of the rows or columns, or even a subset of banks) and reserves this subset of the address space to compensate for a failed device.

In one embodiment, when a device fails, data from the entire rank that includes the failing device is read (e.g., one cache line at a time), corrected using error correction techniques, and the contents of the failing device are copied into the virtual spare device. In one embodiment, copying the contents of the failing device into the virtual spare device involves a partial write to a different rank than the rank with the failing device. A partial write is utilized because only a subset of the cache line is being written. This is because each cache line that is read from the rank with the failing device hose only a portion (e.g., $\frac{1}{8}$ or $\frac{1}{16}$) of the data from the cache line that is bad and is stored in the virtual spare device.

In one embodiment, after the contents of the failing device have been copied into the virtual spare device, future reads to the rank with the failed device perform a second read to the rank with the virtual spare device. Also, future writes perform a partial write to the rank with the virtual spare device.

In one embodiment, in order to achieve a level of reliability comparable to rank sparing, two virtual spare devices are provided on two different ranks. This allows for a device failure on any rank. In this configuration, the capacity cost for virtual device sparing is $\frac{2}{16}$ of a rank for x4 devices and $\frac{2}{8}$ of a rank for x8 devices.

In one embodiment, to achieve the highest level of reliability comparable to DDDC, an additional mechanism that performs a move operation to move the contents of one virtual spare device to another virtual spare device may be provided. This may be utilized in the case where a rank with a virtual spare device that is in use also has a device failure. In this case, a cache line of the virtual spare device that is in use is read (e.g., on cache line at a time) and written to a virtual spare device on a different rank.

The virtual device sparing techniques described herein require less capacity cost than either memory mirroring or rank sparing. Virtual device sparing also does not require lockingstepping, which results in better bandwidth utilization and lower memory power consumption as compared to DDDC, for example.

FIG. 1 is a conceptual diagram of one embodiment of a multi-rank memory system that may be used to provide virtual device sparing as described herein. The memory system of FIG. 1 may be used in any type of electronic system, for example, a desktop computer system, a server, a laptop computer system, diagnostic equipment, etc.

Memory system 100 includes module 110 and module 160, which can be, for example, dual in-line memory modules (DIMMs). Any number of modules can be supported and other types (i.e., non-DIMMs) of modules may be utilized as well. In the example of FIG. 1, module 110 includes rank 120 and rank 125. Similarly, module 160 includes rank 170 and rank 175.

The example of FIG. 1 is a x4 configuration with 18 memory devices (e.g., $130_1$-$130_{18}$ for rank 120, $135_1$-$135_{18}$ for rank 125, $180_1$-$180_{18}$ for rank 170, $185_1$-$185_{18}$ for rank 175) per rank. The techniques described herein may also be applied to other memory configurations, for example, a x8 configuration with 9 memory devices per rank.

In the example of FIG. 1, each module provides a virtual spare device (e.g., virtual spare device 140 on module 110 and virtual spare device 190 on module 160); however, other arrangements for one or more virtual spare devices may be provided. In one embodiment, the virtual shared device includes a portion of each device in a rank and together provides the memory capacity of one device in the rank. Thus, in the x4 configuration of FIG. 1, each device in a rank (e.g., rank 120) has reserved ⅟₁₈ of the device capacity for use when a device in memory system 100 fails.

In one embodiment, memory system 100 includes two virtual spare devices; however, any number of virtual spare devices may be supported. In one embodiment, when a device fails, data from the entire rank that includes the failing device is read, corrected using error correction techniques, and the contents of the failing device are copied into the virtual spare device.

In one embodiment, copying the contents of the failing device into the virtual spare device involves a partial write to a different rank than the rank with the failing device. A partial write is utilized because only a subset of the cache line is being written. This is because each cache line that is read from the rank with the failing device house only a portion of the data from the cache line that is bad and is stored in the virtual spare device.

In one embodiment, after the contents of the failing device have been copied into the virtual spare device, future reads to the rank with the failed device perform a second read to the rank with the virtual spare device. Also, future writes perform a partial write to the rank with the virtual spare device.

When utilizing traditional rank sparing with two dual-rank DIMMs, there would be 16 spare memory devices and, after a failure of a single memory device, 32 usable memory devices. Thus, one failed device results in 15 additional unusable devices and 48 devices of capacity. In contrast, with virtual device sparing in a memory utilizing two dual-rank DIMMS, there would be 16 devices each having ⅟₁₆ reserved and 16 devices that are ¹⁵⁄₁₆ usable. One failed device results in one unusable device and no unusable devices, which results in 62 devices of capacity.

Figure 2:
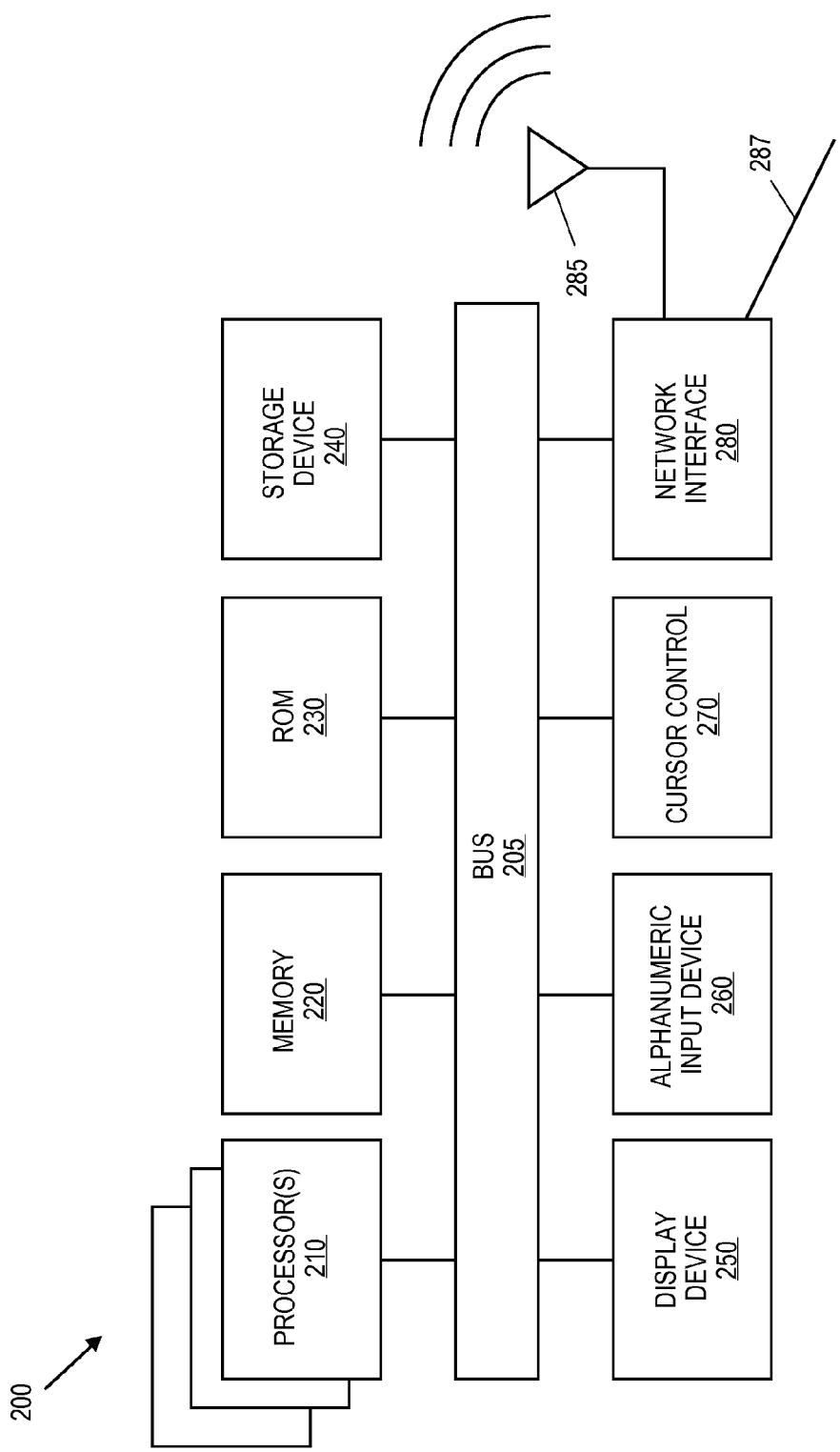
FIG. 2 is a block diagram of one embodiment of an electronic system.

FIG. 2 is a block diagram of one embodiment of an electronic system. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components. The electronic system of FIG. 2 may utilize the memory system of FIG. 1.

Electronic system 200 includes bus 205 or other communication device to communicate information, and processor 210 coupled to bus 205 that may process information. While electronic system 200 is illustrated with a single processor, electronic system 200 may include multiple processors and/or co-processors. Electronic system 200 further may include random access memory (RAM) or other dynamic storage device 220 (referred to as main memory), coupled to bus 205 and may store information and instructions that may be executed by processor 210. Main memory 220 may also be used to store temporary variables or other intermediate information during execution of instructions by processor 210.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Another type of user input device is cursor control 270, such as a mouse, a trackball, or cursor direction keys to communicate direction information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 3:
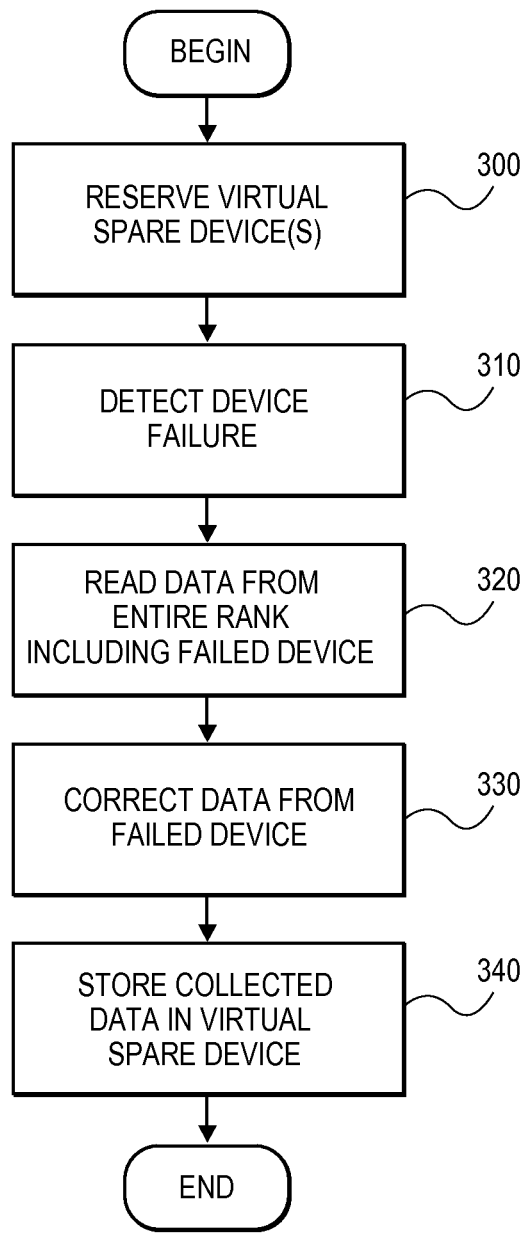
FIG. 3 is a flow diagram of one embodiment of a technique for utilizing virtual device sparing.

FIG. 3 is a flow diagram of one embodiment of a technique for utilizing virtual device sparing. The technique described with respect to FIG. 3 may be used, for example, with a memory system like the one illustrated in FIG. 1.

One or more virtual spare devices is reserved, 300. Any technique for reserving the virtual spare device as described herein may be utilized. In one embodiment, two or more virtual spare devices are reserved with the virtual spare devices being in at least two different ranks in the memory system.

A device failure is detected, 310. Any technique known in the art to determine that a device has failed or is failing may be utilized. The detection may be of a failing device or of a device that has failed. In one embodiment, in response to the detection, the following actions are taken.

Data is read from the entire rank having the failed/failing device, 320. In one embodiment, the data is read one cache line at a time; however, any strategy for reading the data may be utilized. Reading of data from the rank will result in at least some of the data being incorrect.

Data from the failed/failing device is corrected, 300. Any appropriate error correction technique known in the art can be used. The error correction technique may be selected based on, for example, the number of bits stored by a device, the number of correction bits available, etc.

The corrected data is stored in a virtual spare device, 340. In one embodiment, a partial write operation is utilized to store the corrected data bits in the designated section of the virtual spare device. In one embodiment, the virtual spare device is in a different rank than the failed/failing device. Future write operations for a cache line then utilize a partial write to store data in the virtual spare device.

Read operations function in a similar manner. A read operation for a cache line include a second read to the rank having the virtual spare device. The correct cache line can then be assembled from data read from the functioning devices in the rank having the failed/failing device and data read from the virtual spare device.

FIG. 4 is a block diagram of a virtual device sparing agent. The virtual device sparing agent that may be resident within, for example, a server (e.g., within a memory controller) or any other kind of electronic system. Virtual device sparing agent 400 includes control logic 410, which implements logical functional control to direct operation of virtual device sparing agent 400, and/or hardware associated with directing operation of virtual device sparing agent 400. Logic may be hardware logic circuits and/or software routines. In one embodiment, virtual device sparing agent 400 includes one or more applications 412, which represent code sequence and/or programs that provide instructions to control logic 410.

Virtual device sparing agent 400 includes memory 414, which represents a memory device and/or access to a memory resource for storing data and/or instructions. Memory 414 may include the virtual spare device(s) as described herein. Memory 414 may include memory local to virtual device sparing agent 400, as well as, or alternatively, including memory of the host system on which virtual device sparing agent 400 resides. Virtual device sparing agent 400 also includes one or more interfaces 416, which represent access interfaces to/from (e.g., an input/output interface, application programming interface) virtual device sparing agent 400 with regard to entities (electronic or human) external to virtual device sparing agent 400.

Virtual device sparing agent 400 also includes virtual device sparing engine 420, which represents one or more functions that enable virtual device sparing agent 400 to provide the functionality as described herein. Example modules that may be included in virtual device sparing engine 420 are virtual device reservation module 430, failure detection module 440, data relocation module, 450 and data correction module 460. Each of these modules may further include other modules to provide other functions. As used herein, a module refers to routine, a subsystem, etc., whether implemented in hardware, software, firmware or some combination thereof.

Virtual device reservation module 430 operates to reserve the one or more virtual spare devices described herein. Virtual device reservation module 430 may operate with a memory controller (or be part of a memory controller) to reserve portions of memory to be utilized as virtual spare devices. Virtual device reservation module 430 may include registers or other mechanisms to define the locations and/or boundaries of the virtual spare device.

Failure detection module 440 operates to determine when a memory device is failing or has failed. Failure detection module 440 may provide this information to one or more of the other modules of virtual device sparing engine 420 to support operation of the virtual spare devices as described herein.

Data relocation module 450 operates to relocate data as described herein in response to a device failure. In one embodiment, data relocation module 450 manages address mapping as well as partial reads and partial writes to support use of a virtual spare device. Data relocation module may operate with (or be part of) a memory controller to provide this functionality.

Data correction module 460 operates to provide data correction to data stored in the failed/failing device. Data correction module 460 allows the data to be corrected before being stored in the virtual spare device as described herein. Various data correction techniques may be provided by data correction module 460.

A failure of one of a plurality of memory devices corresponding to a first rank in a memory system is detected. The memory system has a plurality of ranks, each rank having a plurality of memory devices used to store a cache line. A portion of the cache line corresponding to the failed memory device is stored in a memory device in a second rank in the memory system and the remaining portion of the cache line in the first rank of the memory system.

In one embodiment, the virtual spare device corresponds to a different rank than a rank corresponding to the failed memory device. The memory controller, in response to the failure of the memory device, causes data to be read from non-failed devices of the selected rank and a portion of the virtual spare device corresponding to the failed device.

In one embodiment, the plurality of memory devices comprise dynamic random access memory (DRAM) devices. In one embodiment, the DRAM devices comprise at least double data rate 3 (DDR3) compliant DRAM devices. In one embodiment, the DRAM devices comprise at least double data rate 3 (DDR4) compliant DRAM devices. In one embodiment, the plurality of memory devices operate as x4 memory devices. In one embodiment, the plurality of memory devices operate as x8 memory devices.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
    a memory controller;
    a memory system coupled with the memory controller, the memory system organized as a plurality of ranks, each rank comprising a plurality of memory devices, wherein a selected rank from the plurality of ranks provides capacity to operate as a virtual spare device to store data;
    wherein, in response to a failure of one of the plurality of memory devices, the memory controller to cause data to be written to the failed memory device to be written to a portion of the virtual spare device.

2. The system of claim 1 wherein the virtual spare device corresponds to a different rank than a rank corresponding to the failed memory device.

3. The system of claim 1, further wherein the memory controller, in response to the failure of the memory device, to cause data to be read from non-failed devices of the selected rank and a portion of the virtual spare device corresponding to the failed device.

4. The system of claim 1 wherein the plurality of memory devices comprise. dynamic random access memory (DRAM) devices.

5. The system of claim 4 wherein the DRAM devices comprise at least one of double data rate 3 (DDR3) compliant or double data rate 4 (DDR4) DRAM devices.

6. The system of claim 1 wherein the plurality of memory devices operate as at least one of x4 or x8 memory devices.

7. The system of claim 1, wherein the provided capacity for the virtual spare device comprises only a fraction of the rank's capacity.

8. The system of claim 1, wherein the data to be written to the failed memory device comprises a portion of data from a cache line of the failed memory device.

9. A method comprising:
   detecting a failure of one of a plurality of memory devices corresponding to a first rank in a memory system, the memory system having a plurality of ranks, each rank having a plurality of memory devices used to store a cache line; and
   storing a portion of the cache line corresponding to the failed memory device in a memory device in a second rank in the memory system and the remaining portion of the cache line in the first rank of the memory system.

10. The method of claim 9 further comprising:
    reading a cache line from the first rank in the memory system;
    determining if one of the plurality of memory devices has failed;
    reading a portion of the cache line from the second rank in the memory system if one of the plurality of memory devices has failed.

11. The method of claim 9 wherein the plurality of memory devices comprise dynamic random access memory (DRAM) devices.

12. The method of claim 11 wherein the DRAM devices comprise at least double data rate 3 (DDR3) or double data rate 4 (DDR4) compliant DRAM devices.

13. The method of claim 9 wherein the plurality of memory devices operate as x4 or as x8 memory.

14. The method of claim 9, wherein a fraction of the memory capacity of the second rank is reserved as a virtual spare device and wherein storing in the second rank comprises storing in the virtual spare device.

15. The method of claim 9 further comprising reserving a fraction of the memory capacity of the first rank as a second virtual spare device.

16. A memory controller to detect a failure of one of a plurality of memory devices corresponding to a first rank in a memory system, the memory system having a plurality of ranks, each rank having a plurality of memory devices used to store a cache line, and to store a portion of the cache line corresponding to the failed memory device in as memory device in a second rank in the memory system and the remaining portion of the cache line in the first rank of the memory system.

17. The memory controller of claim 16, further to read a cache line from the first rank in the memory system, to determine if one of the plurality of memory devices has failed, and to read a portion of the cache line from the second rand in the memory system if one of the plurality of memory devices has failed.

18. The memory controller of claim 16 wherein the plurality of memory devices comprise dynamic random access memory (DRAM) devices.

19. The memory controller of claim 18 wherein the DRAM devices comprise at least double data rate 3 (DDR3) compliant DRAM devices.

20. The memory controller of claim 18 wherein the DRAM devices comprise at least double data rate 4 (DDR4) compliant DRAM devices.

21. The memory controller of claim 16 wherein the plurality of memory devices operate as x4 memory devices.

22. The memory controller of claim 16 wherein the plurality of memory devices operate as x8 memory devices.

* * * * *